United States Patent
Muir et al.

(10) Patent No.: US 11,715,924 B2
(45) Date of Patent: Aug. 1, 2023

(54) SPACE-TIME INDUCED LINEARLY ENCODED TRANSCRIPTION FOR TEMPORAL OPTIMIZATION (STILETTO)

(71) Applicant: Lawrence Livermore National Security, LLC, Livermore, CA (US)

(72) Inventors: Ryan D. Muir, Livermore, CA (US); John E. Heebner, San Ramon, CA (US); Daniel E. Mittelberger, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 442 days.

(21) Appl. No.: 16/796,564

(22) Filed: Feb. 20, 2020

(65) Prior Publication Data

US 2021/0265796 A1 Aug. 26, 2021

(51) Int. Cl.
*H01S 3/00* (2006.01)

(52) U.S. Cl.
CPC .......... *H01S 3/0057* (2013.01); *H01S 3/0085* (2013.01)

(58) Field of Classification Search
CPC .............................. H01S 3/0057; H01S 3/0085
See application file for complete search history.

(56) References Cited

U.S. PATENT DOCUMENTS

| 5,719,650 A * | 2/1998 | Wefers ............... G02F 1/13471 349/75 |
| 6,577,782 B1 * | 6/2003 | Leaird ............... G02B 6/12014 385/15 |
| 6,934,445 B1 | 8/2005 | Leaird et al. |

OTHER PUBLICATIONS

Colombeau et al., "Shaping of Short Laser Pulses by Passive Optical Fourier Techniques," Optics Comm., vol. 19, No. 2, 1976, pp. 201-204.
Leaird et al., "Femtosecond Direct Space-to-Time Pulse Shaping," IEEE J. of Quantum Elec., vol. 37, No. 4, 2001, pp. 194-504.
Leaird et al., "Femtosecond Direct Space-to-Time Pulse Shaping in an integrated-optic configuration," Optics Lett. vol. 29, No. 13, 2004, pp. 1551-1553.
Mansuryan et al., "Compact direct space-to-time pulse shaping with a phase-only spatial light modulator," Optics Lett., vol. 36, No. 9, 2011, pp. 1635-1637.
McKinney et al., "Photonically Assisted Generation of Arbitrary Millimeter-Wave and Microwave Electromagnetic Waveforms via Direct Space-to-Time Optical Pulse Shaping," J. of Lightwave Tech., vol. 21, No. 12., 2003, pp. 3020-3028.

* cited by examiner

*Primary Examiner* — Michael Carter
(74) *Attorney, Agent, or Firm* — Ladas & Parry, LLP (57) ABSTRACT

Space-to-time pulse shaping techniques are provided that maintain high fidelity with a practical output coupler, maintain an output resolution that is no longer than the input pulse, and are scalable to long records while maintaining fine resolution.

35 Claims, 6 Drawing Sheets

SPACE-TIME INDUCED LINEARLY ENCODED TRANSCRIPTION FOR TEMPORAL OPTIMIZATION (STILETTO)

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to the production of arbitrary user defined optical signals, and more specifically, it relates to the production of relatively long record length optical signals while maintaining 1 ps or finer resolution.

Description of Related Art

There is a growing demand for user-defined optical arbitrary waveforms with long record and 1 ps or better resolution. Many optical arbitrary waveform generators that have been published in the literature can achieve ultrafine (femtosecond) resolution. However, due to the very limited record lengths (<10 ps) of these solutions, these have not displaced electrical arbitrary waveform generators driving electro-optic modulators that achieve nanosecond or longer record lengths but extremely coarse ~100+ ps resolution. At the time of the conception of the present technology, the present inventors are not aware of any existing prior art technology demonstrated to produce arbitrary waveforms with hundreds of picoseconds of record length while maintaining 1 ps or finer resolution.

It is desirable to extend the record length of high-resolution optical techniques. The major concepts available for producing high resolution arbitrary waveforms include: spectral pulse shaping (including 4f spectral shapers and acousto-optic programmable dispersive filters, e.g., Dazzler), pulse replicators, photonic time stretch arbitrary waveform generator (AWG), temporal imaging, time domain telescopes, chirped pulse spectral shaping (often called frequency to time conversion), the Spectrally Transcribed And Chirp Corrected Arbitrary Temporal Optimizer (STACCATO) (U.S. patent application Ser. No. 16/084,160, incorporated herein by reference), and direct space to time pulse shaping. The primary challenges associated with the majority of these pulse shapers is the record length vs. resolution tradeoff for the linear techniques, or the high complexity for the nonlinear techniques. The exception may be direct space-to-time pulse shaping, which is a simple linear technique that is not predicted to trade record length for resolution. Moreover, these techniques enable direct control over pixels in the time domain allowing it to be readily controlled as part of a feedback loop with a temporal diagnostic to deliver arbitrary waveforms targeting a user requested pulse shape.

Several direct space-to-time pulse shaping techniques have been demonstrated, though all demonstrations known to us to date have produced a low number of resolvable spots, making them incompatible with long records. Further, the simple pinhole output of the demonstrated techniques compromises output signal record length and spatial fidelity for pinholes larger than the optical wavelength. Finally, the majority of the demonstrations thus far have resulted in output resolutions that are much longer than the input pulse. For all these limitations, the known recourse for improvement is also limited. It is therefore highly desirable to develop a novel space-to-time pulse shaping technique that can maintain high fidelity with a practical output coupler, maintains an output resolution that is no longer than the input pulse, and is scalable to long records while maintaining fine resolution.

SUMMARY

An embodiment of the technology provides an optical arbitrary waveform generation technology for transient optical signals in a time regime of hundreds of femtoseconds to nanoseconds for which currently there is a significant instrumentation gap. In some ways, similar to other space-to-time pulse shaping techniques, a pulse front tilted optical impulse is spatially patterned and then collapsed to a single mode. One contrast between an embodiment of the present technology and other space-to-time pulse shaping technique is that here the tilted pulse front is down magnified and imaged onto the spatial light modulator at the matching tilted plane, which preserves the full temporal resolution of the generated arbitrary waveform across the entire record. Further, the single mode output coupler used preserves the full temporal record of the generated arbitrary waveform. Consequently, the scalability to a large number of resolvable spots is improved by over an order of magnitude compared to any previously demonstrated space-to-time technique. Finally, integration of this pulse shaping method with a temporal recording diagnostic enables closed loop feedback control to ensure that waveforms match a user requested pulse shape.

BRIEF DESCRIPTION OF THE DRAWINGS

The accompanying drawings, which are incorporated into and form a part of the disclosure, illustrate embodiments of the technology and, together with the description, serve to explain the principles of the technology.

DETAILED DESCRIPTION

Figure 1A:
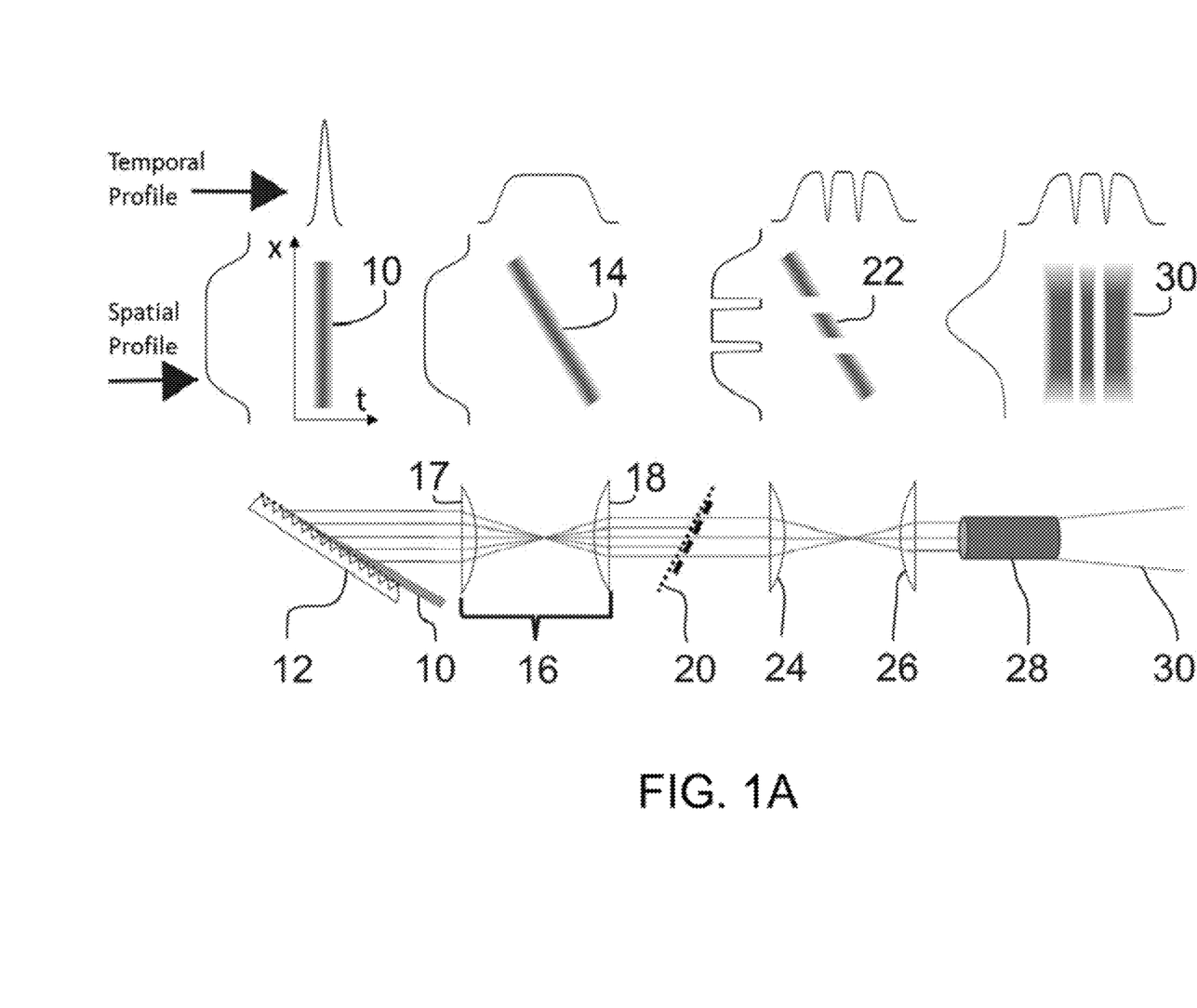
FIG. 1A shows an exemplary optical system of the present technology, and further shows the resulting signal proximate to their respective locations within the system.

Arbitrary waveform generation can be accomplished in a simple linear architecture that retains the benefits of direct modulation of the time domain. FIG. 1A shows an exemplary optical system of the present technology, and further shows the resulting signal proximate to their respective locations within the system. An ultrafast (<1 ps) laser pulse 10 is diffracted from an optic 12, such as a diffraction grating or a prism, which results in a pulse front tilt (tilted pulse 14), which enables a mapping of space to time. This creates a means for directly patterning the time content of the pulse by manipulating the pulsed beam in space. An embodiment of the technology provides a novel optical arbitrary waveform generation technology for transient optical signals in a time regime of hundreds of femtoseconds to nanoseconds for which currently there is a significant instrumentation gap. The spatial manipulation is accomplished by imaging the diffractive optic in an imaging system using telescope 16, which comprises lenses 17 and 18, onto a spatial pattern 20, such as a mask or spatial light modulator (SLM). To create temporal features as fine as the initial pulse, the spatial pattern must be positioned and angled to match the image of the diffractive optic whereby at each position across the beam, the spatial separation of spectral components due angular dispersion can be fully mitigated. Unless the grating and input pulse angle are chosen to generate a beam that diffracts off the grating at a normal angle, the spatial pattern 20 will not be normal to the beam, and any image magnification or demagnification from telescope 16 will change the imaged pulse tilt angle relative to the object pulse tilt angle. After spatial patterning at the image plane, the laser pulse 22 has the desired temporal profile, and the spatial profile may now be corrected to achieve a single spatial mode beam (e.g., a spatially Gaussian beam). The tilted, patterned laser pulse is finally coupled, using, e.g., coupling optics 24 and 26, into a single-spatial-mode system 28, such as an optical cavity, waveguide, fiber optic system, series of apertures, etc. The resulting light 30 is collapsed to a single spatial mode with no pulse front tilt while retaining the specified temporal profile.

The input (ultrafast laser pulse 10) to the diffraction grating 12 in FIG. 1A is an ultrafast laser pulse that originates from the lower-right and propagates onto optic 12 at an angle such that some rays travel a relatively shorter distance to reach the lens, while other rays travel a relatively longer distance to reach the lens. Those skilled in the art will appreciate that rays diffracted from optic 12 nearer to the lower end will travel a shorter distance to optic 17 that rays diffracted from optic 12 nearer to its top end. This illustrates that portions of the input pulse receive a long delay, while other portions receive a short delay, which overall results in pulse front tilt. The figure also shows the respective temporal and spatial profiles of each of pulses 10, 14, 22, and 30.

The telescope images the grating onto a mask (a pattern) 20. The telescope in this figure down-magnifies the image of the large grating so that it can fit onto a small programmable mask (spatial tight modulator or SLM). If the grating and input pulse angle is chosen to generate a beam that diffracts oil the grating at a normal angle, the image plane of the grating will always be at normal incidence to the beam, regardless of the telescope magnification. This normal incidence configuration comes at the tradeoff of record length due to a less aggressive pulse front tilt, and may require the use of larger imaging optics. However, if the light does not leave the grating at normal incidence (e.g., Littrow grating orientation), the image plane of the grating will be angled and the SLM must be oriented to match this angle, in order to preserve resolution at all points in the record. Incidentally, down magnification also changes the angle of the image relative to the light to an angle that is closer to normal incidence. This is fortuitous for use with available SLMs, since they tend to work better at small incidence angles instead of large incidence angles. The resulting patterned pulse is coupled into a single-spatial-mode system 28, such as a single-mode optical fiber. Depending upon the application, the rays may be directed into the fiber while they are collimated, while they are converged to a single point, or while they are diverging/converging. Each condition has tradeoffs or effects on the light that couples into the fiber.

Generally, the output directly correlates with the mask. Having a totally open mask (or no mask) results in a single long pulse that is as long in time as the pulse front tilt. Masking away portions of that pulse m space directly masks away portions of time that couple into the fiber. To generate a desired waveform in time, one provides a mask that has that desired waveform.

Figure 1B:
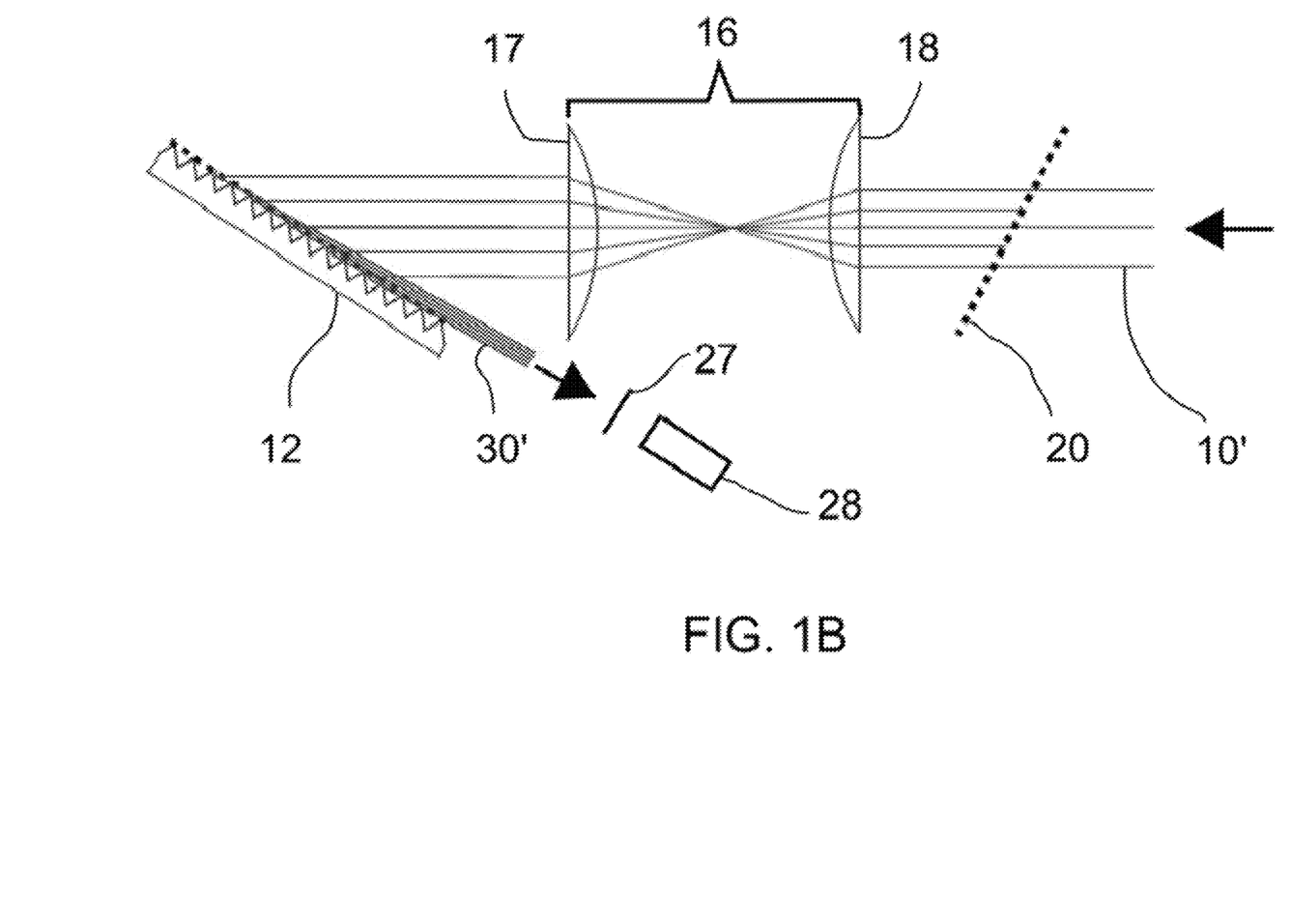
FIG. 1B illustrates an exemplary optical system of the present technology in which the input laser pulse is directed m the opposite direction from that of FIG. 1A.

FIG. 1B illustrates an exemplary optical system of the present technology in which the input laser pulse 10' is directed in the opposite direction from that of FIG. 1A. Elements in this figure that are similar or identical to those of FIG. 1A have the same reference numbers. Pulse 10' propagates through patterning system 20 which is imaged by an imaging system embodied by telescope 16 onto grating 12. The output pulse 30' comprises a tilted pulse front and a spatial pattern and is directed through another imaging system 27 into single-spatial-mode system 28. Note that embodiments of the present technology generally can be operated in either direction with appropriate placement of a single-spatial-mode system at the output.

Derivation of Theoretical Performance

In the first step of creating a temporally patterned laser pulse, the input laser pulse is tilted by a diffractive optic, thus coupling its spatial and temporal profiles. Pulse front tilt (PFT) is a spatiotemporal coupling of a laser pulse in which the laser group delay, $\tau_0$, varies linearly with a spatial coordinate, resulting in a tilted laser intensity front (e.g., the rightmost edge of the laser arrives before the leftmost edge). It is caused by angular dispersion of the laser spectrum (i.e., different color components go in different directions). The pulse front tilt angle of laser pulse, $\psi$, is defined as $$\tan\psi = c\frac{dt_0}{dx} = \frac{c}{\lambda}\frac{d\theta}{df} \quad (1)$$

where $\lambda$ is the central wavelength of the light, c is the speed of light, and $d\theta/df$ is the change in propagation angle versus frequency.

For the specific case of a diffraction grating, the induced PFT angle $\psi_{grating}$ induced is given by $$\tan\psi_{grating} = \frac{\lambda}{\Lambda}\sec\theta_{out}, \quad (2)$$

where $\theta_{out}$ is the angle of light diffracted off the grating, $\Lambda$ the grating line spacing, and the diffraction order is assumed to be m=−1. The record length, $\tau_0$, is the temporal duration of the tilted pulse and is the amount of time over which the arbitrary optical waveform can be generated. Assuming the full grating is illuminated, the record length is $$\tau_0 = \frac{L\lambda}{c\Lambda} \approx \frac{2L}{c}, \quad (3)$$

where L is the length of the grating. For strong gratings, where $\lambda/\Lambda$ approaches 2, the approximation on the right becomes valid.

Figure 2:
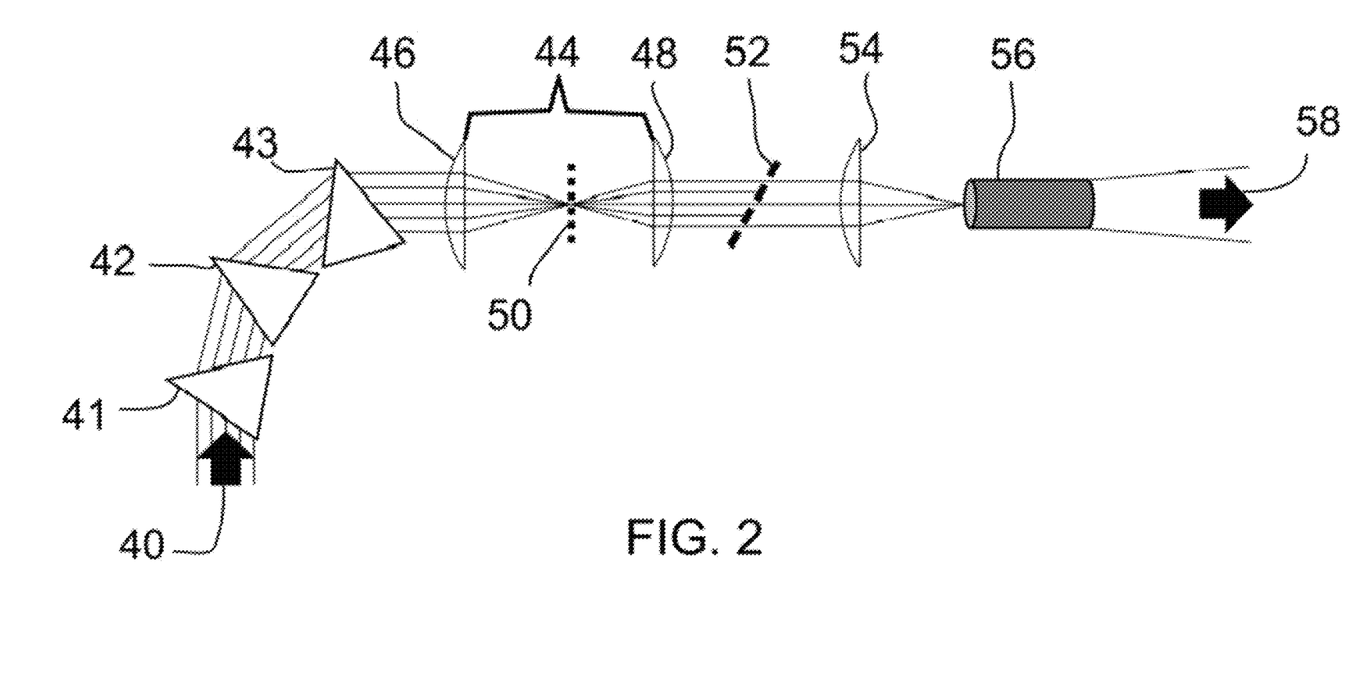
FIG. 2 shows several exemplary modifications to the optical system of FIG. 1A.

Pulse front tilt can be generated using a grating, prism, or etalon. To avoid large optics, multiple prisms or strikes of a grating can be used to additively increase the pulse front tilt. Due to the relationship between pulse front tilt and spectral dispersion, the multiple passes or strikes of a grating or prism do not need re-imaging optics prior to each successive strike though to retain maximum temporal resolution, the spatial separation of spectral components due to the accumulated angular dispersion must be recombined at an image plane matching the patterning element (SLM). FIG. 2 shows exemplary alternate configurations of the present technology. Laser pulse 40 propagates through prisms 41-43 which produce a titled pulse front that the propagates through a telescope 44 comprising lenses 46 and 48. In one configuration, a SLM 50 is placed in the telescope (e.g., at the focal plane of lens 46) and in another configuration, SLM 52 is placed between lens 48 and a means (e.g., lens 54) for coupling the far field into a single spatial mode system 56, to produce an output pulse 58. Note that one or more etalons can be used instead of the prisms. Note also that the laser pulse 40 can be patterned, prior to entering telescope 44. Note also that these configurations can be operated by directing an input pulse through the system in the opposite direction, i.e., the spatial patterning occurs before the pulse front tilt is produced. Note that embodiments or elements of the present technology can be implemented as an integrated photonic circuit. For example, the optical system, imaging system, spatial patterning system and single-spatial-mode-system can be formed as an integrated photonic circuit. Alternately, at least one of the optical system, imaging system, spatial patterning system and single-spatial-mode-system can be an integrated photonic circuit element.

Figure 3:
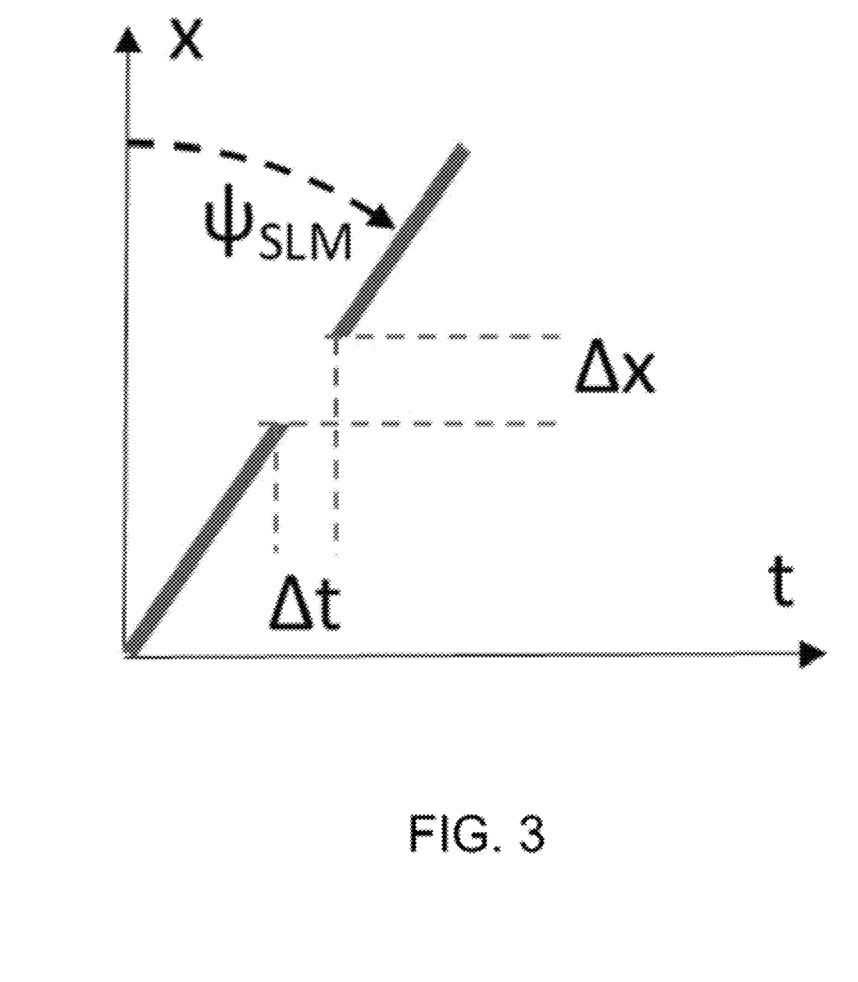
FIG. 3 is a schematic of a pulse with an impulse temporal profile, showing the relationship between spatial and temporal feature sizes.

After the input pulse is tilted, it is imaged onto a spatial pattern. Since the pulse has PFT, patterning the spatial profile modulates the temporal profile. For an input pulse with an impulse function temporal profile (i.e., an arbitrarily short pulse), a spatial pattern with feature size $\Delta x$ (as projected along laser propagation axis) will result in a temporal feature size $\Delta t = (\Delta x/c)\tan \psi_{SLM}$ as illustrated in FIG. 3. A finite-duration Gaussian input pulse with a duration $\tau$ will result in a temporal resolution of $$\Delta t = \sqrt{((\Delta x/c)\tan\psi_{SLM})^2 + \tau^2}, \quad (4)$$

where the input pulse duration, $\tau$, sets a lower limit on the temporal resolution possible. It is assumed in Equation (4) here that the spatial features are also Gaussian. Since the record length (equation 3) is completely independent of the temporal resolution (equation 4), there is no temporal resolution vs. record length tradeoff, and the device is scalable to long records while maintaining fine resolution. Thus, FIG. 3 is a schematic of a pulse with an impulse temporal profile, showing the relationship between spatial and temporal feature sizes.

The spatial patterning must be done at an image plane of the diffractive optic because the spectrum of the tilted laser pulse is angularly dispersed. The resulting temporal pattern is a convolution of the spatial pattern and the instantaneous pulse duration. Away from the image plane, the different spectral components will not overlap, reducing the local bandwidth and increasing the minimum temporal feature size (i.e., the temporal pattern will be less sharp because the instantaneous pulse duration will be longer). One notable exception is the Fourier or spectral plane. Patterning at the spectral plane (see FIG. 2) will directly modify the spectrum of the pulse, because at this plane space is mapped to spectrum rather than time. Imaging with a magnification M changes both the PFT angle of the laser pulse and the angle of the image plane. Due to longitudinal magnification, the angle of the image of the grating will be $$\theta_{image} = \tan^{-1}(M \tan(\theta_{out})). \quad (5)$$

For other diffractive optics (e.g., a prism or a virtual images phase array), $\theta_{out}$ is the angle of the virtual image plane from which the different color components appear to diverge. Magnification also changes the PFT angle at the image plane, given by $$\psi_{image} = \tan^{-1}\left(\frac{1}{M}\tan(\psi_{grating})\right). \quad (6)$$

Down-magnification (M<1) to typical SLM sizes also reduces the angle of the image plane, $\theta_{image}$, which is needed for compatibility with SLMs that are typically designed to operate close to normal incidence. Despite the change in PFT angle, $\psi$, the record length at the image remains the same.

Finally, the spatially patterned pulse is coupled into a single mode system, and the PET record is collapsed into a single spatial mode. The coupling efficiency of the patterned waveform into the single mode system is described as the overlap integral of the input mode with the single mode, $$F(t) = \frac{\left|\int E(x, y, t)E_S^* dA\right|^2}{\int |E(x, y, t)|^2 dA \int |E_S|^2 dA} \quad (7)$$

where E(x,y,t) is the electric field of the modulated pulse at the in-coupling plane of the single mode system and $E_s = E_s(x,y)$ is the single mode. Equation (7) is a function of time, and the coupling efficiency at different times is independent. This overlap integral will be non-uniform across the PET record due to the mismatched a ode of the PFT record and the single-mode system.

Figure 4A:
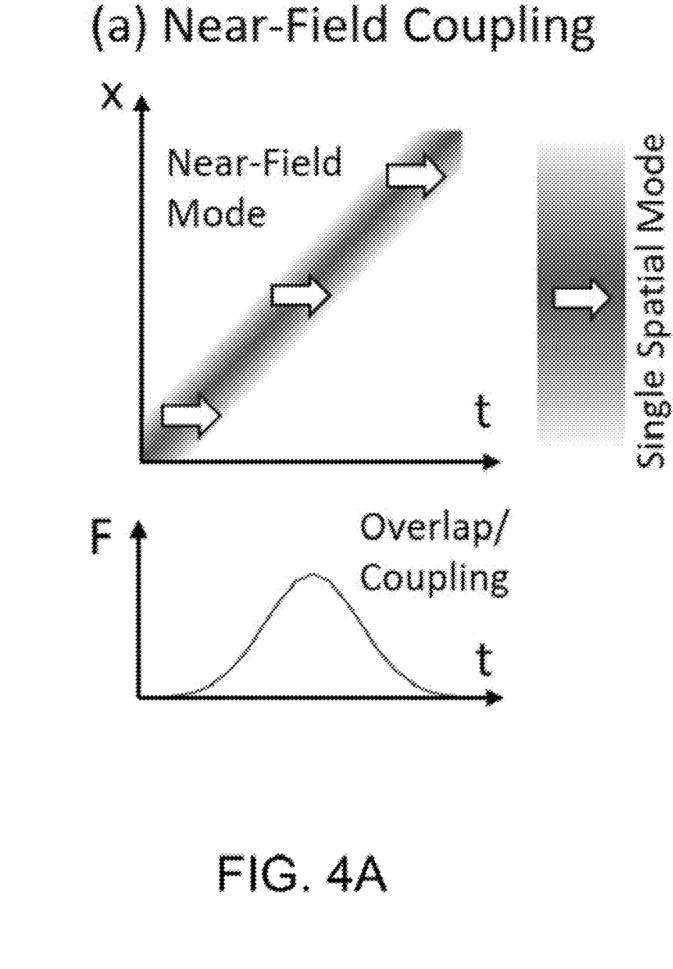
FIG. 4A shows near-field coupling of a tilted laser pulse into a single spatial mode and includes a lower plot where the coupling of the laser into the single mode is given by the overlap integral.
Figure 4B:
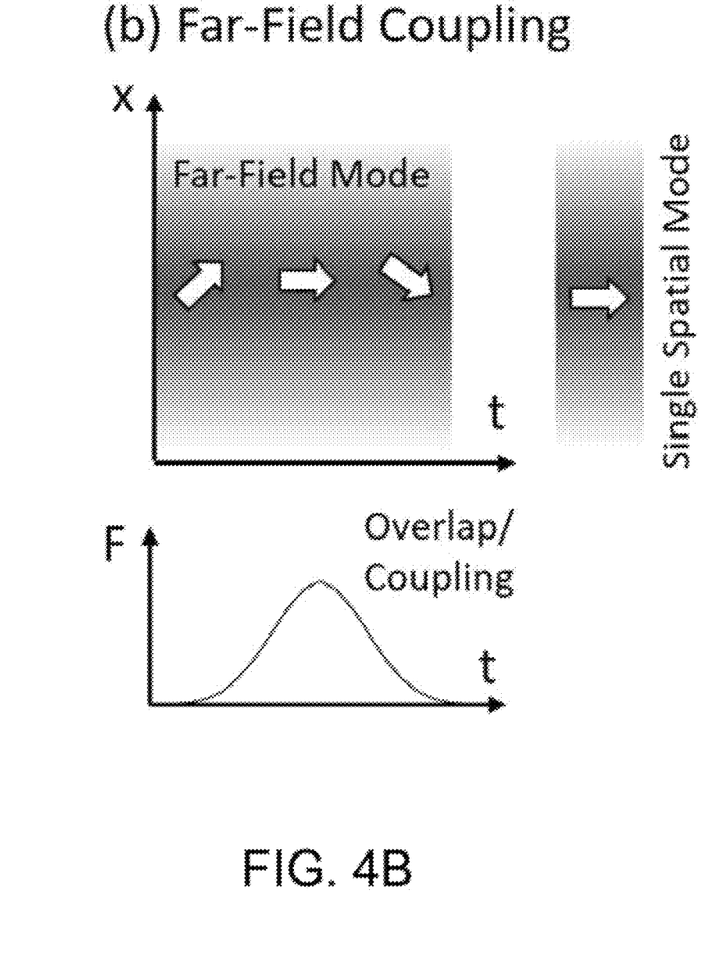
FIG. 4B shows that far-field coupling results in an overlap integral that is similarly shaped because the single spatial mode is selective in both spatial and angular distribution.

Coupling can be performed in the near field (FIG. 4A) or far field (FIG. 4B) of the tilted pulse front, with degenerate results when coupling either of these two discrete planes. In nearfield coupling, different parts of the temporal record can couple with varying efficiency into the single mode system because the overlap integral is a function of time. Oversizing the nearfield pulse into the coupler causes shortening of the temporal record due to mode mismatch between the ends of the pulse in the near-field and the system single mode. To ensure that the entire temporal record is well coupled, the tilted pulse must be resized so that the record fits within the system mode. Alternatively, the coupling can be performed in the far field (i.e., the optical Fourier transform of the image plane), in which case the condition for good coupling of the entire record length is that the angular content of the patterned pulse is smaller than the NA of the single mode system (i.e. the numerical aperture of the focusing pulse is much less than the acceptance numerical aperture of the single mode system). Practically, this is accomplished by using a sufficiently long focal length coupling lens to ensure an oversized far-field plane. In either case, increasing the length of the coupled record decreases the coupling efficiency at the center of the record, and does not affect the temporal resolution. Thus, FIG. 4A shows near-field coupling of a tilted laser pulse into a single spatial mode. The coupling of the laser into the single mode is given by the overlap integral, F(t), which is shown in the lower plot. This overlap integral varies with time because the middle of the pulse is well-aligned to the spatial mode while the beginning and end are offset in x due to the pulse's tilt. FIG. 4B shows that far-field coupling results in an overlap integral, F(t), that is similarly shaped because the single spatial mode is selective in both spatial and angular distribution. The coupling of the laser into the single mode is given b the overlap integral, F(t), which is shown in the lower plot. The laser pulse has no time-varying transverse offset, but the beginning and end of the pulse do not couple well because of their large angular content (indicated by white arrows).

Figure 5:
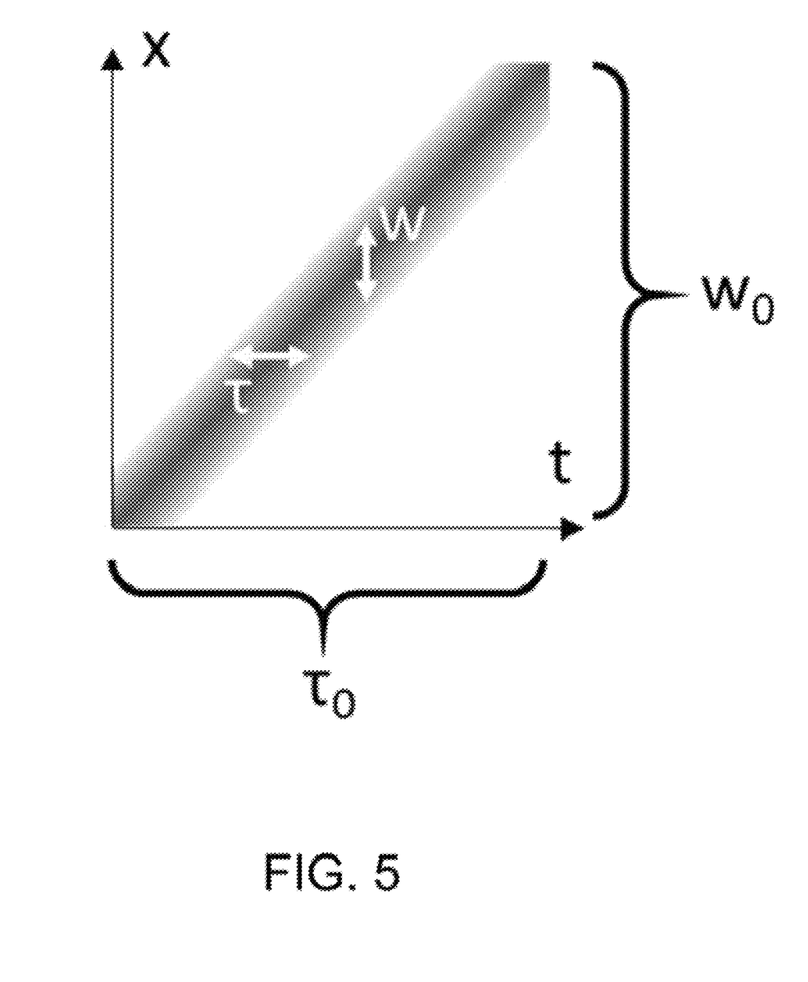
FIG. 5 shows the relationship between instantaneous spot size, w, spot size, $w_0$, pulse duration, $\tau$, and total pulse length, $\tau_0$.

If the single spatial mode and the modulated laser mode are Gaussian, then the near-field coupling efficiency F(t) is given by $$F(t) = \frac{2ww_{mode}}{w^2 + w_{mode}^2} \exp\left\{\frac{-8\ln 2(ct)^2}{(w^2 + w_{mode}^2)\tan^2\psi_{coupling}}\right\}, \quad (8)$$

where $\psi_{coupling}$ is pulse front tilt angle at the coupling plane (given by Equation (5)), $w_{mode}$ is the full width at half maximum (FWHM) size of the single mode (see FIG. 5), and the instantaneous laser mode size is $$w = \left(\frac{\tan^2\psi_{coupling}}{c^2\tau^2} + \frac{1}{w_0^2}\right)^{-1/2} \quad (9)$$

with instantaneous duration τ (which is the input pulse duration, assuming proper imaging) and integrated spot size $w_0$. FIG. 5 shows the relationship between instantaneous spot size, w, spot size, $w_0$, pulse duration, τ, and total pulse length, $\tau_0$. The record is thus apodized to a FWHM of $$\tau_A = \frac{\tan\psi_{coupling}}{c}\sqrt{\frac{1}{2}(w^2 + w_{mode}^2)}. \quad (10)$$

The total record length is the lesser of $\tau_A$ or $\tau_0$ (given by Equation (3)), and the average coupling efficiency scales inversely with the record length. In the far-field, the coupling efficiency is $$F(t) = \frac{2w_{far}w_{mode}}{w_{far}^2 + w_{mode}^2} \exp\left\{\frac{-1}{8\ln 2}\frac{w_{far}^2 w_{mode}^2}{w_{far}^2 + w_{mode}^2}\left(\frac{\pi ct}{f\lambda\tan\psi_{coupling}}\right)^2\right\}, \quad (11)$$

where f is the focal length of the coupling lens, λ is the central wavelength of the coupled light, and $w_{far}$ is the FWHM far-field mode size (see FIG. 4B). It is assumed here that the near-field is transformed to the far-field by a single-lens 2f optical system.

The signal to noise ratio (SNR) of the output record power is mainly dependent upon the output coupling power at that timepoint in the record. The dominant noise source in ideal and passive systems is quantum noise ($P_{quantum} \approx \pi h\nu/T$). The noise coherently beats with the record, with a maximum amplitude $(4P_{Record}P_{quantum})^{1/2}$ and a root-mean-square amplitude of $(2P_{Record}P_{quantum})^{1/2}$. The SNR can be defined as the ratio of this root-mean-square coherent beating to the patterned record and calculated as a power ratio:

$$SNR = \sqrt{\frac{P_{Record}}{2P_{quantum}}}. \quad (12)$$

Since the output coupling efficiency inversely scales with the record length, and the input pulse peak power is distributed across the pulse front tilted record, the peak power of the output coupled record scales inversely with the square of the record length. When this relationship is combined with the SNR equation, SNR can be improved linearly by decreasing the record length, or nonlinearly by the radicand of an increasing input pulse power.

The coupled laser pulse is temporally transform limited, meaning the laser has exactly enough spectral content to support imposed temporal profile. This property arises because a single mode system has limited spatial and angular acceptance. For large spatial features, only the narrow spectral component well aligned to the single mode system couples well. Short temporal features correspond to small spatial features (see equation 4) and thus have high angular content due to diffraction. Each spectral component receives an angular bandwidth that is inversely proportional to the mask width. This mixes the spectral components so a broader bandwidth is coupled into the single mode system for shorter features. The bandwidth coupled at each point in the record corresponds to the transform limited bandwidth required to support the masked temporal feature size.

The central wavelength of the coupled laser pulse spectrum can be tuned by modifying the coupling to the single-mode system. If the coupling to the single mode system is done in the near field, the spectral component that is coupled (the ventral wavelength of the coupled profile) can be changed by adjusting the angle between the laser and the single mode system. This is because different spectral components have different propagation angles and a single mode system has a limited acceptance angle so only the portion of the spectrum within this acceptance will be coupled efficiently. If the coupling is in the far field, each spectral component focuses to a tranverse location so the spectrum of light coupled into the single mode system is determined by its transverse location, rather than its relative angle as in near field coupling.

If the single-mode-coupling plane is translated from either the near-field or far-field discrete planes, the spectrum of the coupled laser will broaden. This far field-nearfield hybrid plane results in a temporally dependent coupling of spectrum, resulting in chirp (dω/dt) of the coupled pulse. Alternatively, chirp can be applied by placing a lens at or near the spatial mask, which adds a quadratic spatial phase and results in a quadratic temporal phase at the output. The amount of chirp imposed by defocusing the light to the coupling plane can greatly exceed chirps attainable by conventional free space stretchers and compressors, at the tradeoff of efficiency. This could be used for seed pulse compression or stretching, for seed chirp pre-correction, or for partial B-integral correction for downstream aberrations.

While any SLM could be used to impose a mask on the tilted pulse front record, the diffractive control provided by a phase-only SLM results in unique additional properties. In addition to using the phase-only SLM to generate a mask, using some of its remaining dynamic range can be used to deflect the beam laterally, which provides control over the center wavelength of the generated arbitrary waveform. Drawing a lens with the remaining dynamic range results in a chirped arbitrary waveform. More generally stated, diffracting portions of the record laterally results in a shift in the coupled central wavelength for that portion of the record, resulting in arbitrary control of central wavelength at every point in the record. This compact design allows for convenient SLM control over many other parameters: selection of center wavelength, selection of chirp sign, selection of start/stop wavelengths, arbitrary control of high order dispersion parameters, and arbitrary temporal control over all of these listed features (true AWG). Placing a second SLM at intermediary spectral plane further allows for arbitrary normalization and correction of the input laser pulse.

Design limitations and experimental imperfections (e.g., component nonidealities) limit the agreement between the spatial profile from the spatial light modulator (SLM) and the resulting temporal profile after the regenerative amplifier, but a desired temporal profile can still be produced by implementing a closed feedback loop. The SLM pattern needed to produce a desired temporal profile can be determined using feedback ideally from a single-shot ultrafast temporal characterization system, though multiple acquisition diagnostics such as scanning autocorrelators, cross-correlators, spectral interferometers, FROGs, SPIDERs, SLICER, etc. . . . can be used. A closed-loop optimization algorithm can iteratively modify the SLM profile to achieve a desired temporal profile from the characterization system.

Since this is a linear system, many of the orders of operations may be interchanged, and independent linear operations may be performed upstream of this device. For example, the light may strike the SLM and pulse front tilt generating device in any order. This may have utility for device miniaturization or other practical design parameters. As another example, this device, a stretcher, and a compressor may be serially used in any order with identical results. This is particularly useful for drop-in additions of this device to chirped puke amplification laser systems.

Exemplary Extensions of the Technology

For SLMS with multiple rows of pixels, multiple channels of information could be formatted onto different rows. These could be treated as separate regions to be coupled into different single mode systems, or they could be coupled into the same single mode system. These channels could encode different polarizations, spectral components, or sub-record. In particular, polarizing beam displacing prisms could be placed before and after the SLM to laterally split the orthogonally polarized components to different regions of the SLM and then recombine them before coupling. Alternatively, a twisted nematic SLM could arbitrarily rotate the input polarization at every point in the record. More generally, polarization and spectral channels could be made by placing polarizing or dichroic beam splitters to split the beam to multiple SLMs and then recombine them before coupling. Finally, staggered copies of the of pulse could be generated to create multiple sub-records and formatted along rows of the SLM (a virtually imaged phase array), that stitch together to a longer record once combined into a single spatial mode.

An SLM consisting of individually controlled micromirrors can add pulse front tilt to and spatially pattern the ultrafast laser pulse simultaneously. This would eliminate the need for an imaging system between the diffractive optic and the spatial pattern since both would occur at the same location. The mirrors would be arranged as the ridges of the grating 12 in FIG. 1 so as to create staggered reflections, resulting in pulse front tilt. This could also be accomplished by creating a diffractive pattern on another type of SLM with sufficiently high spatial resolution for efficient diffraction.

Implementing the system described here in a planar or slab waveguide instead of in free space would create a photonic integrated circuit, capable of producing laser pulses with programmable temporal profiles. This could be integrated with other photonic devices for the purposes of signal processing or computation.

A fiber bundle at the output coupler can be used to achieve a variety of simultaneous outputs. Each SLM row can be treated as an independent channel, and a phase mask or SLM can be used to vertically deflect channels to adjacent vertical fibers. Adjacent horizontal fibers couple color shifted copies of the output when coupling the far field, or couple smaller sub-records when coupling in the nearfield.

More masks and SLMs can be added for additional arbitrary waveform controls. Inserting a frosted glass filter at an intermediate image plane generates high angular content at the coupling plane. The amplitude envelope imposed by the mask is still scribed, though instead of a transform limited bandwidth, a large amount of bandwidth is coupled at every timepoint. Alternatively, adding noise to the mask SLM or to a second SLM at an intermediate image plane could simulate a ground glass filter. Custom SLM patterns in the second SLM could be used to sculpt arbitrary bandwidth per timepoint in the record. This could be used for frequency modulation SBS suppression in high energy density laser systems. A mask or SLM can be added to the system at an intermediate spectral plane for additional spectral shaping or filtering, though with global instead of local control. This spectral domain SLM could also be used to correct for spectrum aberrations, as a Fourier pulse shaper, or as an arbitrary optical filter.

Exemplary Advantages of the Technology

The proposed technology resembles a direct space to time pulse shaper; in both setups, an input pulse is patterned by a mask or SLM, is directed to a grating, and is then directed to an output aperture. However, compared to existing direct space to time pulse shapers and other pulse shapers, there are many advantages to the STILETTO setup: 1. STILETTO down images large gratings at the matching down-magnified angle onto common small SLMs, which maintains the full record and resolution. 2. STILETTO uses a single mode system as the output coupler and formats the beam onto the output coupler to maintain the full record provided by the grating size. 3. As a result of 1 and 2, STILETTO scales up well, such that an order of magnitude or more resolvable spots can be generated compared to any other existing pulse shaper. 4. STILETTO is center wavelength tunable at every point in the record. 5. STILETTO can be configured to achieve arbitrary polarization at every point in the record. 6. STILETTO can put out chirped pulses that exceed the stretching capability of conventional stretchers and compressors, with: selection of center wavelength, selection of chirp sign, selection of start/stop wavelengths, arbitrary control of second order dispersion and higher order dispersion parameters, and arbitrary normalization and correction of the coupled spectrum.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

All elements, parts and steps described herein are preferably included. It is to be understood that any of these elements, parts and steps may be replaced by other elements, parts and steps or deleted altogether as will be obvious to those skilled in the art.

We claim:

1. A method, comprising:
    directing a laser pulse to an optical system configured to produce a tilted pulse front from said laser pulse;
    directing said tilted pulse front through an imaging system configured to image said optical system onto a spatial patterning system, wherein said patterning system produces a temporally patterned pulse from said tilted pulse front; and
    coupling said temporally patterned pulse into a single-spatial-mode-system to produce an output pulse.

2. The method of claim 1, wherein said optical system is selected from the group consisting of at least one diffractive optic, at least one prism and at least one etalon.

3. The method of claim 1, wherein said laser pulse comprises a pulse duration of less than 1 ps.

4. The method of claim 1, wherein said imaging system comprises a telescope, wherein said telescope comprises a magnification selected from the group consisting of 1:1 and 1:<1.

5. The method of claim 1, wherein the step of producing a temporally patterned pulse from said tilted pulse front utilizes a patterning system selected from the group consisting of a mask and a spatial light modulator (SLM).

6. The method of claim 1, wherein said single-spatial-mode system is selected from the group consisting of an optical cavity, a waveguide, fiber optic system, and a series of apertures.

7. The method of claim 1, comprising at least one of (i) wherein said output pulse is spatially confined to a single spatial mode with no pulse front tilt or space time coupling and (ii) wherein said output pulse retains the temporal profile of said patterned pulse.

8. The method of claim 1, wherein said laser pulse is directed onto said optic at an angle such that, to reach said imaging system, some rays of said laser pulse travel a relatively shorter distance from said optic than other rays of said laser pulse, which results in said tilted pulse front.

9. The method of claim 1, wherein said patterned pulse is coupled into said single-spatial-mode-system in one of (i) the near field of said patterned pulse or (ii) the far field of said patterned pulse.

10. The method of claim 1, further comprising tuning the central wavelength of the coupled laser pulse spectrum of said patterned pulse by adjusting the coupling between said patterned pulse and said single-spatial-mode-system.

11. The method of claim 1, further comprising applying a chirp to said tilted pulse front.

12. The method of claim 1, wherein said output pulse comprise a record length selected from the group consisting of (i) at least 100 ps and a resolution of at least 1 ps and (ii) within a range of 100 ps to 1 ns and a resolution of at least 1 ps.

13. The method of claim 1, wherein said output pulse is patterned with at least one temporal feature that is not longer than said laser pulse.

14. The method of claim 1, further comprising comparing said temporally patterned pulse to a desired temporal profile and iteratively modifying said patterning system so that subsequent temporally patterned pulses converge toward said desired temporal profile.

15. An apparatus, comprising:
    an optical system configured to produce a tilted pulse front from a laser pulse;
    an imaging system configured to image said optical system onto a spatial patterning system, wherein when said tilted pulse front is directed through said imaging system, said patterning system produces a temporally patterned pulse from said tilted pulse front; and
    a single-spatial-mode-system positioned to receive said temporally patterned pulse to produce an output pulse.

16. The apparatus of claim 15, wherein said optical system is selected from the group consisting of at least one diffractive optic, at least one prism and at least one etalon.

17. The apparatus of claim 15, wherein said laser pulse comprises a pulse duration of less than 1 ps.

18. The apparatus of claim 15, wherein said imaging system comprises a telescope, wherein said telescope comprises a magnification selected from the group consisting of 1:1 and 1:<1.

19. The apparatus of claim 15, wherein said patterning system is selected from the group consisting of a mask and a spatial light modulator (SLM).

20. The apparatus of claim 15, wherein said single-spatial-mode system is selected from the group consisting of an optical cavity, a waveguide and a series of apertures.

21. The apparatus of claim 15, comprising at least one of (i) wherein said output pulse is spatially confined to a single spatial mode with no pulse front tilt or space time coupling and (ii) wherein said output pulse retains the temporal profile of said patterned pulse.

22. The apparatus of claim 15, further comprising means for coupling said patterned pulse into said single-spatial-mode-system in one of (i) a near field of said patterned pulse or (ii) a far field of said patterned pulse.

23. The apparatus of claim 15, wherein said output pulse comprise a record length selected from the group consisting of (i) at least 100 ps and a resolution of at least 1 ps and (ii) within a range of 100 ps to 1 ns and a resolution of at least 1 ps.

24. The apparatus of claim 15, wherein said output pulse comprises a resolution feature size that is no longer than a length of said laser pulse.

25. The apparatus of claim 15, further comprising means for iteratively modifying said patterning system so that subsequent temporally patterned pulses converge toward a desired temporal profile.

26. The apparatus of claim 15, wherein at least one of said optical system, said imaging system, said spatial patterning system and said single-spatial-mode-system are an integrated photonic circuit element.

27. An apparatus, comprising:
    a pulse tilting/patterning system including:
        an imaging system having an optical axis;
        a pulse tilting optical system located on said optical axis; and
        a pulse spatial patterning system, the pulse spatial patterning system including a programmable mask disposed at an angle to said optical axis and wherein an output pulse is produced when a laser pulse is directed on said optical axis through said pulse tilting/patterning system.

28. The apparatus of claim 27, wherein when said laser pulse is directed to said pulse tilting optical system in the direction from said pulse tilting optical system to said imaging system, said pulse tilting optical system is configured to produce a tilted pulse front from said input pulse, wherein said imaging system is configured to image said pulse tilting optical system onto said pulse spatial patterning system, and wherein said pulse spatial patterning system is configured to produce a temporally patterned pulse from said tilted pulse front.

29. The apparatus of claim 27, wherein when said laser pulse is directed to said pulse spatial patterning system in the direction from said pulse spatial patterning system to said imaging system, said pulse spatial patterning system is configured to produce a temporally patterned pulse from said input pulse, wherein said imaging system is configured to image said pulse spatial patterning system onto said pulse tilting optical system, and wherein said pulse tilting optical system is configured to produce a tilted pulse front from said temporally patterned pulse.

30. The apparatus of claim 27, wherein the pulse tilting optical system has an image plane disposed at an angle to said optical axis and wherein the angle of image plane of the programmable mask relative to the optical axis matches the angle of the image plane of the diffraction grating or prism relative to the optical axis.

31. The apparatus of claim 30, wherein the imaging system includes the ability to alter magnification of optical images transiting the imaging system and wherein matching the image planes of diffraction grating or prism to the programmable mask includes fixing the angle of the image plane of the programmable mask relative to the optical axis as a function of an amount of magnification or demagnification occurring in the imaging system.

32. A method, comprising:
providing a pulse tilting/patterning system including:
an imaging system having an optical axis;
a pulse tilting optical system located on said optical axis; and
a pulse spatial patterning system, the pulse spatial patterning system including a programmable mask disposed at an angle to said optical axis and wherein; and
directing a laser pulse on said optical axis through said pulse tilting/patterning system to produce an output pulse.

33. The method of claim 32, wherein the step of directing comprises directing said laser pulse to said pulse tilting optical system in the direction from said pulse tilting optical system to said imaging system, wherein said pulse tilting optical system produces a tilted pulse front from said input pulse, wherein said imaging system images said pulse tilting optical system onto said pulse spatial patterning system, and wherein said pulse spatial patterning system produces a temporally patterned pulse from said tilted pulse front.

34. The method of claim 32, wherein the step of directing comprises directing said laser pulse to said pulse spatial patterning system in the direction from said pulse spatial patterning system to said imaging system, wherein said pulse spatial patterning system produces a temporally patterned pulse from said input pulse, wherein said imaging system images said pulse spatial patterning system onto said pulse tilting optical system, and wherein said pulse tilting optical system produces a tilted pulse front from said temporally patterned pulse.

35. An apparatus, comprising:
an optical system configured to produce a tilted pulse front from a laser pulse; and
an imaging system configured to image said optical system onto a spatial patterning system, wherein when said tilted pulse front is directed through said imaging system, and wherein said patterning system produces a temporally patterned pulse from said tilted pulse front.

* * * * *